(12) United States Patent
Doyle

(10) Patent No.: US 6,502,345 B1
(45) Date of Patent: Jan. 7, 2003

(54) FISH HOOK RELEASING DEVICE

(76) Inventor: Randell Doyle, 1332 N Thorntree Dr., Houston, TX (US) 77015

( * ) Notice: Subject to any disclaimer, the term of this patent is extended or adjusted under 35 U.S.C. 154(b) by 0 days.

(21) Appl. No.: 09/838,851

(22) Filed: Apr. 20, 2001

(51) Int. Cl.⁷ .............................................. A01K 97/24
(52) U.S. Cl. ...................................................... 43/17.2
(58) Field of Search ............................ 43/42.02, 42.15, 43/42.75, 17.2

(56) References Cited

U.S. PATENT DOCUMENTS

| | | | | |
|---|---|---|---|---|
| 1,697,120 A | * | 1/1929 | Johns | |
| 2,606,390 A | | 8/1952 | Farmer | |
| 2,739,407 A | | 3/1956 | Godsey | |
| 3,006,102 A | * | 10/1961 | Chapman | 43/42 |
| 3,011,284 A | | 12/1961 | Sawyer | |
| 3,037,315 A | * | 6/1962 | Klawitter | 43/42.02 |
| D274,547 S | | 7/1984 | Godlewski | |
| 4,514,926 A | * | 5/1985 | Weber, Sr. | 43/17.2 |
| 4,515,926 A | | 5/1985 | Weber, Sr. | |
| 4,748,763 A | * | 6/1988 | Giraudo et al. | 43/42.72 |
| 4,982,524 A | | 1/1991 | Vissing | |
| 5,393,537 A | * | 2/1995 | Rawlins | 426/1 |
| 5,517,781 A | * | 5/1996 | Paoletta et al. | 43/42.06 |
| 5,832,654 A | * | 11/1998 | McQueeny | 43/42.04 |
| 6,079,146 A | * | 6/2000 | Larsen | 43/42.06 |
| 6,161,324 A | * | 12/2000 | Hugunin | 43/42.06 |
| 6,189,256 B1 | * | 2/2001 | Boys | 43/43.12 |

* cited by examiner

Primary Examiner—Charles T. Jordan
Assistant Examiner—Bret Hayes

(57) ABSTRACT

A fish hook releasing device for releasing fishing lures caught on underwater obstructions. The fish hook releasing device includes a housing with an interior space and designed for coupling to a fishing line, a hook plate is positioned adjacent a back end of the housing and is designed for coupling to a fishing hook, and a biasing assembly is positioned within the interior space of the housing and coupled to the hook plate such that the hook plate is biasable away from the housing when the fish hook becomes entangled on debris, the biasing assembly is for biasing the housing towards the hook plate such that the housing strikes the hook plate to release the fishing hook from the debris when the fishing line is slackened.

8 Claims, 4 Drawing Sheets

FISH HOOK RELEASING DEVICE

BACKGROUND OF THE INVENTION

1. Field of the Invention

The present invention relates to release devices and more particularly pertains to a new fish hook releasing device for releasing fishing lures caught on underwater obstructions.

2. Description of the Prior Art

The use of release devices is known in the prior art. More specifically, release devices heretofore devised and utilized are known to consist basically of familiar, expected and obvious structural configurations, notwithstanding the myriad of designs encompassed by the crowded prior art which have been developed for the fulfillment of countless objectives and requirements. Known prior art includes U.S. Pat. No. 4,982,524; U.S. Pat. No. 4,514,926; U.S. Pat. No. 2,739,407; U.S. Pat. No. 2,606,390; U.S. Pat. No. 3,011,284; and U.S. Pat. No. Des. 274,547.

While these devices fulfill their respective, particular objectives and requirements, the aforementioned patents do not disclose a new fish hook releasing device. The inventive device includes a housing with an interior space and designed for coupling to a fishing line, a hook plate is positioned adjacent a back end of the housing and is designed for coupling to a fishing hook, and a biasing assembly is positioned within the interior space of the housing and coupled to the hook plate such that the hook plate is biasable away from the housing when the fish hook becomes entangled on debris, the biasing assembly is for biasing the housing towards the hook plate such that the housing strikes the hook plate to release the fishing hook from the debris when the fishing line is slackened.

In these respects, the fish hook releasing device according to the present invention substantially departs from the conventional concepts and designs of the prior art, and in so doing provides an apparatus primarily developed for the purpose of releasing fishing lures caught on underwater obstructions.

SUMMARY OF THE INVENTION

In view of the foregoing disadvantages inherent in the known types of release devices now present in the prior art, the present invention provides a new fish hook releasing device construction wherein the same can be utilized for releasing fishing lures caught on underwater obstructions.

The general purpose of the present invention, which will be described subsequently in greater detail, is to provide a new fish hook releasing device apparatus and method which has many of the advantages of the release devices mentioned heretofore and many novel features that result in a new fish hook releasing device which is not anticipated, rendered obvious, suggested, or even implied by any of the prior art release devices, either alone or in any combination thereof.

To attain this, the present invention generally comprises a housing with an interior space and designed for coupling to a fishing line, a hook plate is positioned adjacent a back end of the housing and is designed for coupling to a fishing hook, and a biasing assembly is positioned within the interior space of the housing and coupled to the hook plate such that the hook plate is biasable away from the housing when the fish hook becomes entangled on debris, the biasing assembly is for biasing the housing towards the hook plate such that the housing strikes the hook plate to release the fishing hook from the debris when the fishing line is slackened.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fish hook releasing device apparatus and method which has many of the advantages of the release devices mentioned heretofore and many novel features that result in a new fish hook releasing device which is not anticipated, rendered obvious, suggested, or even implied by any of the prior art release devices, either alone or in any combination thereof.

It is another object of the present invention to provide a new fish hook releasing device which may be easily and efficiently manufactured and marketed.

It is a further object of the present invention to provide a new fish hook releasing device which is of a durable and reliable construction.

An even further object of the present invention is to provide a new fish hook releasing device which is susceptible of a low cost of manufacture with regard to both materials and labor, and which accordingly is then susceptible of low prices of sale to the consuming public, thereby making such fish hook releasing device economically available to the buying public.

Still yet another object of the present invention is to provide a new fish hook releasing device which provides in the apparatuses and methods of the prior art some of the advantages thereof, while simultaneously overcoming some of the disadvantages normally associated therewith.

Still another object of the present invention is to provide a new fish hook releasing device for releasing fishing lures caught on underwater obstructions.

Yet another object of the present invention is to provide a new fish hook releasing device which includes a housing with an interior space and designed for coupling to a fishing line, a hook plate is positioned adjacent a back end of the housing and is designed for coupling to a fishing hook, and a biasing assembly is positioned within the interior space of the housing and coupled to the hook plate such that the hook plate is biasable away from the housing when the fish hook becomes entangled on debris, the biasing assembly is for biasing the housing towards the hook plate such that the housing strikes the hook plate to release the fishing hook from the debris when the fishing line is slackened.

Still yet another object of the present invention is to provide new fish hook releasing device that is scented to aid in attracting fish.

Even still another object of the present invention is to provide a new fish hook releasing device that is hydrodynamically efficient to minimize turbulence.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
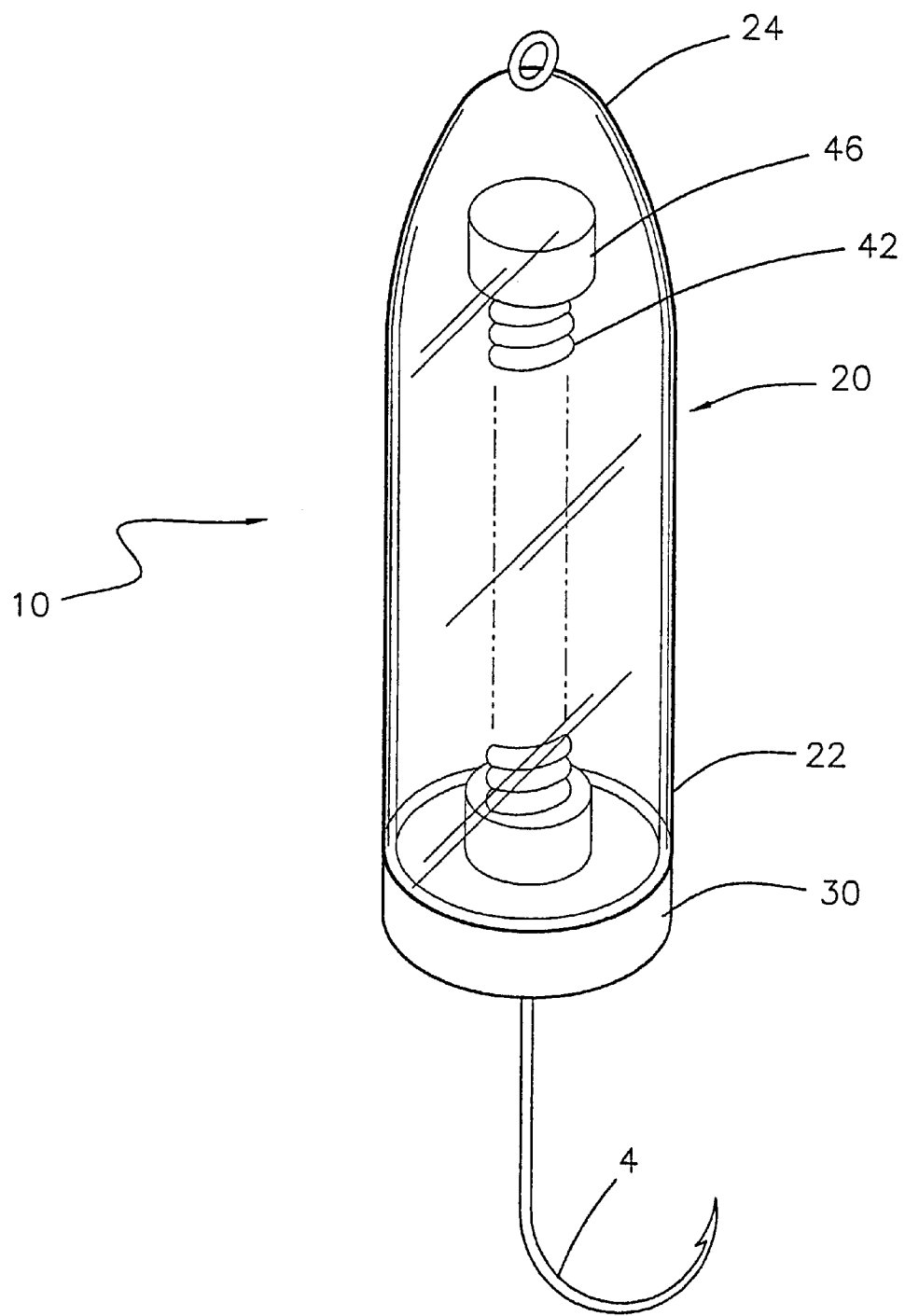
FIG. 1 is a schematic perspective view of a new fish hook releasing device according to the present invention.
Figure 2:
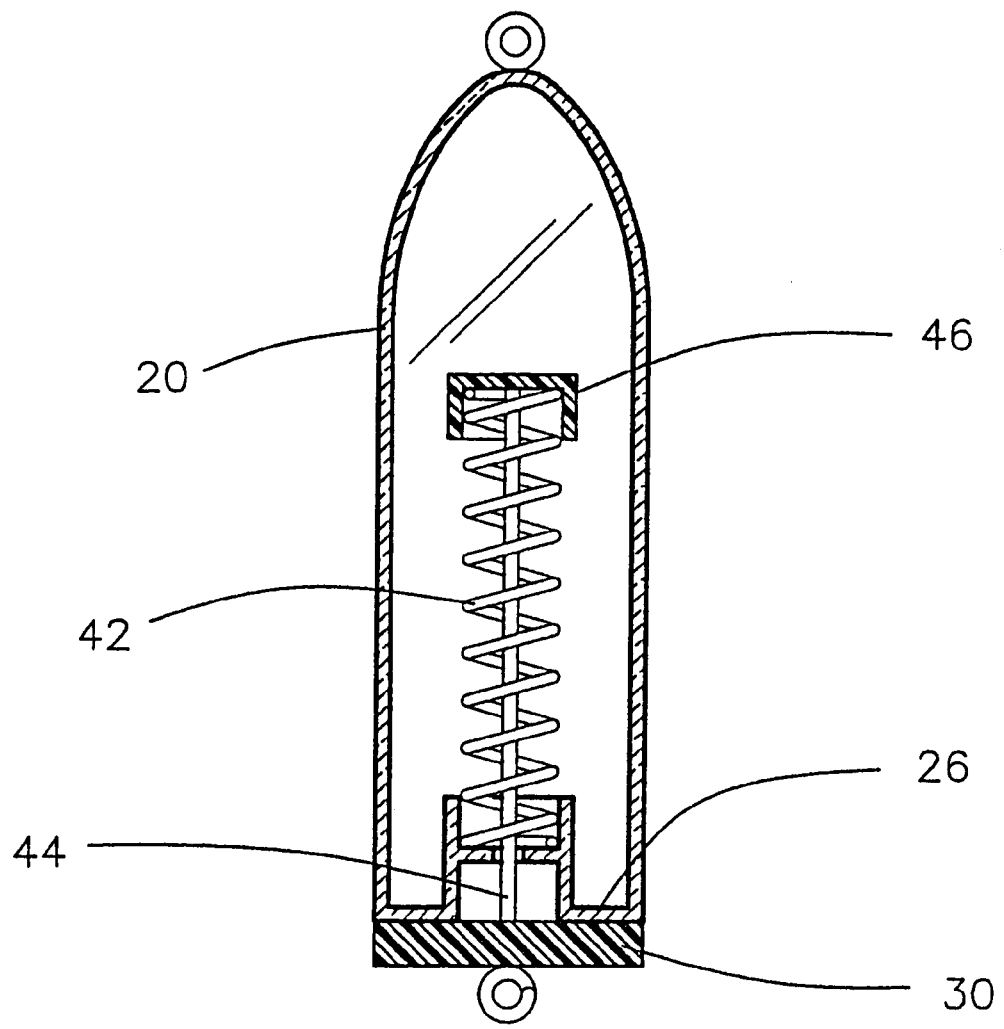
FIG. 2 is a schematic cross-sectional view of the present invention.
Figure 3:
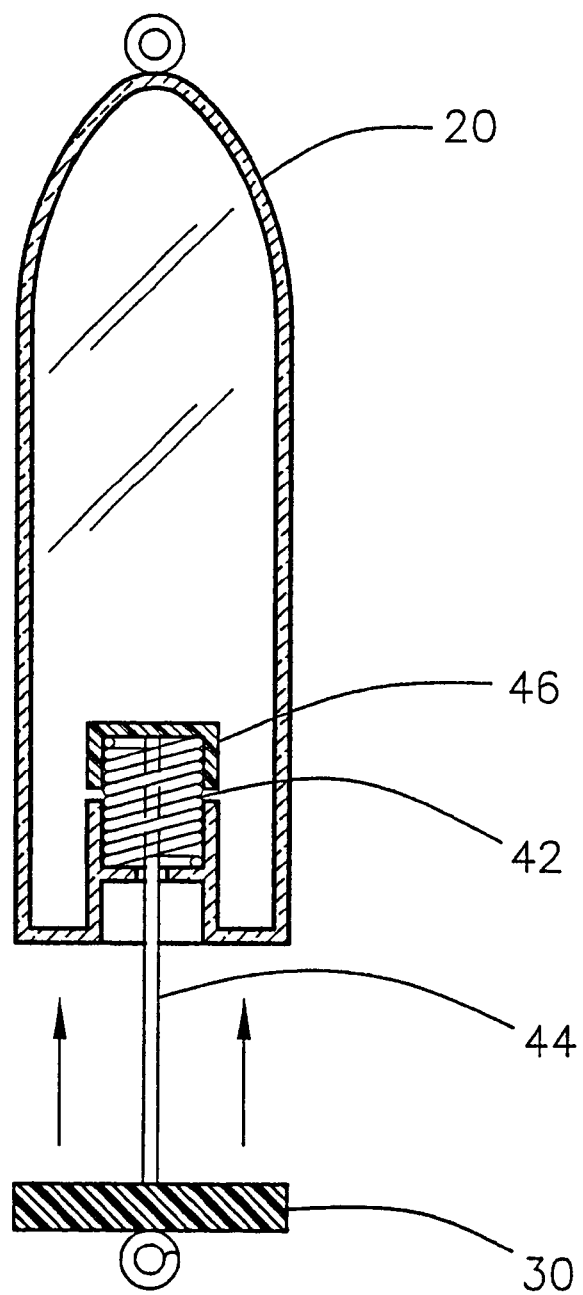
FIG. 3 is a schematic cross-sectional view of the present invention in the extended position.
Figure 4:
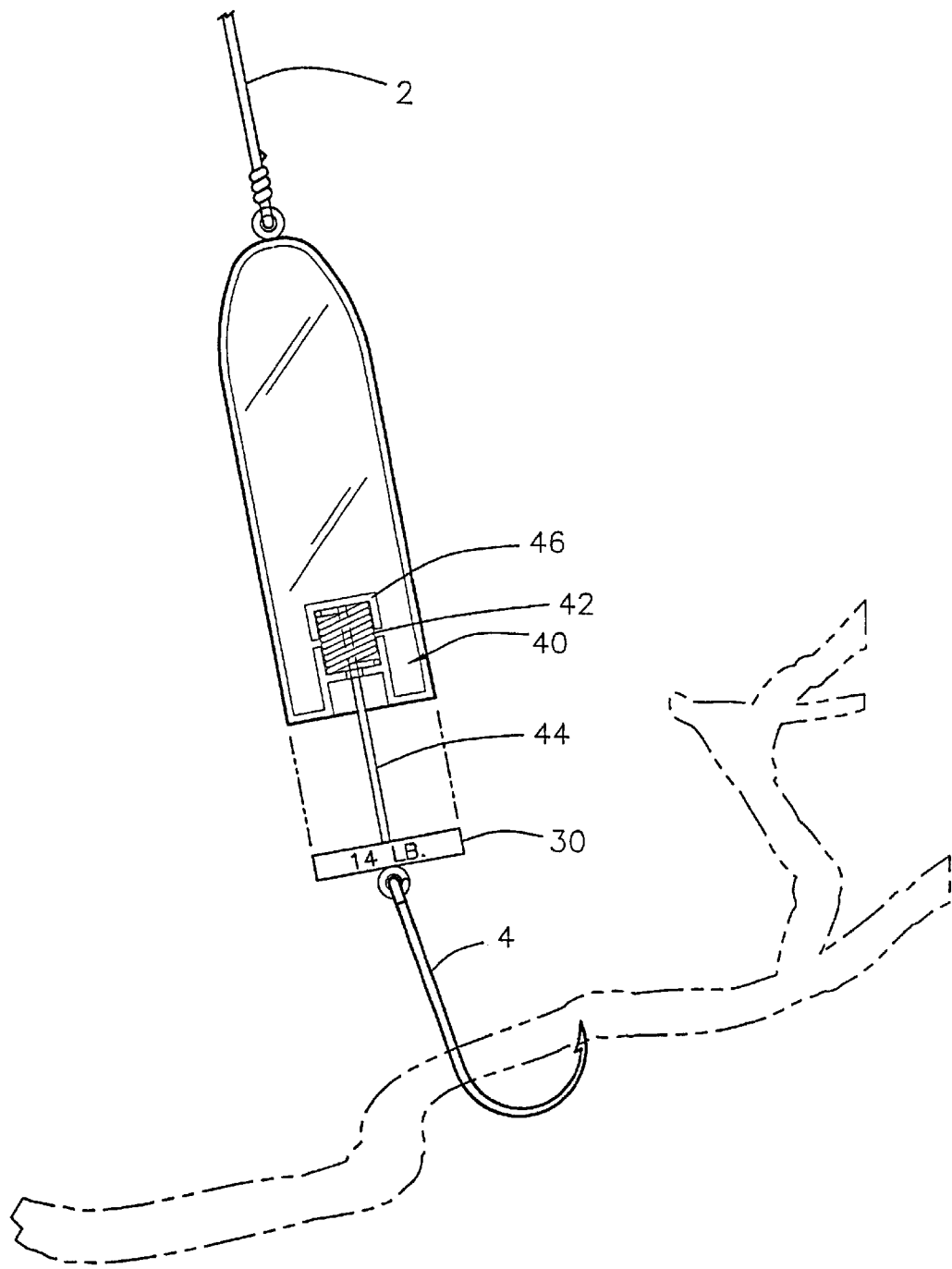
FIG. 4 is a schematic cross-sectional view of the present invention in use.

With reference now to the drawings, and in particular to FIGS. 1 through 4 thereof, a new fish hook releasing device embodying the principles and concepts of the present invention and generally designated by the reference numeral 10 will be described.

As best illustrated in FIGS. 1 through 4, the fish hook releasing device 10 generally comprises a housing 20, a hook plate 30, and a biasing assembly 40.

The housing 20 includes an interior space. The housing 20 is designed for coupling to a fishing line 2.

The hook plate 30 is positioned adjacent to a back end 22 of the housing 20. The hook plate 30 is designed for coupling to a fishing hook 4.

The biasing assembly 40 is positioned within the interior space of the housing 20. The biasing assembly 40 is coupled to the hook plate 30 such that the hook plate 30 is biasable away from the housing 20 when the fish hook 4 becomes entangled on debris. The biasing assembly 40 is for biasing the housing 20 towards the hook plate 30 such that housing 20 strikes the hook plate 30 to release the fishing hook 4 from the debris when the fishing line 2 is slackened.

In an embodiment the housing 20 has a rounded forward end 24 such that the rounded forward end 24 is designed for passing through water without creating turbulence.

In a further embodiment the housing 20 comprises a scented material such that the scented material is released to attract fish when the housing 20 is in water.

In yet a further embodiment the biasing assembly 40 has a compression member 42, which is connected to an end of a line 44 coupled to the hook plate 30 such that extension of the hook plate 30 away from the housing 20 compresses the compression member.

In an embodiment end of the line 44 is coupled to an end cap 46. The end cap 46 is coupled to the compression member 42 such that backward movement of the hook plate 30 moves the line 44. Thus the end cap 46 urges the compression member 42 to a compressed position.

In still a further embodiment the housing 20 has a housing cap 26 positioned adjacent to the back end 22 of the housing 20. The housing cap 26 is coupled to the compression member 42 opposite the end cap 46 such that the housing cap 26 supports the compression member 42 when the compression member 42 expands.

In a further embodiment the compression member 42 is a spring. The spring 42 includes a compression force less than a test weight of the fishing line 2 such that the spring 42 is urged to into compression before the line 2 will break.

In use, the fishing hook snag release device is coupled to the fishing line and the desired lure is coupled to the fishing hook snag release device. The line and lure are then ready to be cast in the conventional manner. When the lure becomes snagged on debris, the user then pulls on the line with a force of approximately 14 pounds, and moves the line less than a few inches in order to compress the biasing assembly. The user then quickly releases the tension on the line, releasing the biasing assembly, which in turn strikes the hook plate. This sharp impact provides the necessary force to release the hook from the debris.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fishing hook snag release device for releasing a fishing hook from a snag while a user fishes, said device comprising:

a housing having an interior space, said housing being adapted for coupling to a fishing line;

a hook plate being positioned adjacent a back end of said housing, said hook plate being adapted for coupling to the fishing hook: and a biasing assembly being positioned within said interior space of said housing, said biasing assembly being coupled to said hook plate such that said hook plate is movable away from said housing when the fish hook becomes entangled on debris, said biasing assembly being for biasing said housing towards said hook plate such that said housing strikes said hook plate to release the fishing hook from the debris when the fishing line is slackened;

wherein said biasing assembly includes a compression member operatively connected to said hook plate in a manner such that extension of said hook plate away from said housing compresses said compression member.

2. The device as set forth in claim 1, wherein said housing has a rounded forward end such that said rounded forward end is adapted for passing through water without creating turbulence.

3. The device as set forth in claim 1, wherein said housing comprising a scented material such that said scented material is released to attract fish when said housing is in water.

4. A fishing hook snag release device for releasing a fishing hook from a snag while a user fishes, said device comprising:

a housing having an interior space, said housing being adapted for coupling to a fishing line;

a hook plate being positioned adjacent a back end of said housing, said hook plate being adapted for coupling to the fishing hook; and a biasing assembly being a positioned within said interior space of said housing, said biasing assembly being coupled to said hook plate such that said hook plate is movable away from said housing when the fish hook becomes entangled on debris, said biasing assembly being for biasing said housing towards said hook plate such that said housing strikes said hook plate to release the fishing hook from the debris when the fishing line is slackened;

wherein said biasing assembly has a compression member being connected to an end of a line coupled to said hook plate such that extension of said hook plate away from said housing compresses said compression member.

5. The device as set forth in claim 4, wherein end of said line is coupled to an end cap, said end cap being coupled to said compression member such that backward movement of said hook plate moves said line whereby said end cap urges said compression member to a compressed position.

6. The device as set forth in claim 5, wherein said housing has a housing cap positioned adjacent said back end of said housing, said housing cap being coupled to said compression member opposite said end cap such that said housing cap supports said compression member when said compression member expands.

7. The device as set forth in claim 4, wherein said compression member is a spring, said spring having a compression force less than a test weight of the fishing line such that said spring is urged to into compression before the line will break.

8. A fishing hook snag release device for releasing a fishing hook from a snag while a user fishes, said device comprising:

a housing having an interior space, said housing being adapted for coupling to a fishing line;

a hook plate being positioned adjacent a back end of said housing, said hook plate being adapted for coupling to a fishing hook;

a biasing assembly being positioned within said interior space of said housing, said biasing assembly being coupled to said hook plate such that said hook plate is biasable away from said housing when the fish hook becomes entangled on debris, said biasing assembly being for biasing said housing towards said hook plate such that said housing strikes said hook plate to release the fishing book from the debris when the fishing line is slackened;

wherein said housing has a rounded forward end such that said rounded forward end is adapted for passing through water without creating turbulence;

wherein said housing comprising a scented material such that said scented material is released to attract fish when said housing is in water;

wherein said biasing assembly has a compression member being connected to an end of the fishing line coupled to said hook plate such that extension of said hook plate away from said housing compresses said compression member;

wherein end of said line is coupled to an end cap, said end cap being coupled to said compression member such that backward movement of said hook plate moves said line whereby said end cap urges said compression member to a compressed position;

wherein said housing has a housing cap positioned adjacent said back end of said housing, said housing cap being coupled to said compression member opposite said end cap such that said housing cap supports said compression member when said compression member expands; and wherein said compression member is a spring, said spring having a compression force less than a test weight of the fishing line such that said spring is urged into compression before the line will break.

* * * * *